United States Patent [19]
Endo et al.

[11] Patent Number: 5,113,293
[45] Date of Patent: May 12, 1992

[54] MAGNETIC RECORDER/REPRODUCER

[75] Inventors: Kazuhito Endo; Masayuki Ishida; Yoshinobu Ishida, all of Nagaokakyo, Japan

[73] Assignee: Mitsubishi Denki Kabushiki Kaisha, Tokyo, Japan

[21] Appl. No.: 619,625

[22] Filed: Nov. 29, 1990

Related U.S. Application Data

[63] Continuation of Ser. No. 486,499, Feb. 27, 1990, which is a continuation of Ser. No. 214,275, Jun. 30, 1988, Pat. No. 4,905,100, which is a continuation of Ser. No. 19,612, Feb. 27, 1987, Pat. No. 4,835,627, which is a continuation of Ser. No. 696,051, Jan. 29, 1985, Pat. No. 4,675,754.

[30] Foreign Application Priority Data

Feb. 21, 1984 [JP] Japan .................. 59-32130
Mar. 16, 1984 [JP] Japan .................. 59-51866
Mar. 30, 1984 [JP] Japan .................. 59-64584

[51] Int. Cl.$^5$ .................................... G11B 5/09
[52] U.S. Cl. ............................. 360/32; 360/48
[58] Field of Search ......................... 360/32, 48

[56] References Cited

U.S. PATENT DOCUMENTS 4,685,004  8/1987  Takahashi et al. .................. 360/32

Primary Examiner—Vincent P. Canney
Attorney, Agent, or Firm—Lowe, Price, LeBlanc and Becker

[57] ABSTRACT

A magnetic recorder/reproducer converts two-channel analog signals into digital signals by a sample-and-hold-/A-D converter circuit (3) and controls addresses in a memory circuit (4) by a memory address control circuit (5), to distribute the digital signals into odd sample groups and even sample groups per each channel for arraying the odd sample groups and the even sample groups of the same channel in alternate scanning intervals, thereby to write the same in the memory circuit so that the odd samples and the even samples of the same channel are arrayed in positions separated from each other along the direction of scanning by rotary heads (10, 11). The digital signals thus permutated are modulated by a modulation circuit (7), to be recorded in a magnetic tape by the rotary heads. The digital signals reproduced by the rotary heads are demodulated by a demodulation circuit (14), to be stored in a memory circuit (15). A memory address control circuit (16) controls addresses so as to permutate samples of the reproduced digital signals stored in the memory circuit to be in the original array thereof. The reproduced digital signals read from the memory circuit are converted into analog signals by a D-A converter (18), to be outputted through a low-pass filter (19).

15 Claims, 8 Drawing Sheets

FIG. 7

| | | L CHANNEL (A) | | | | R CHANNEL (B) | | | | R CHANNEL (B) | | | | L CHANNEL (A) | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 1 FRAME LENGTH | 0 | $W_{L0}$ | $W_{L2}$ | $W_{L4}$ | $W_{L6}$ | $W_{R1}$ | $W_{R3}$ | $W_{R5}$ | $W_{R7}$ | $W_{R0}$ | $W_{R2}$ | $W_{R4}$ | $W_{R6}$ | $W_{L1}$ | $W_{L3}$ | $W_{L5}$ | $W_{L7}$ |
| | 1 | $W_{L8}$ | $W_{L10}$ | $W_{L12}$ | $W_{L14}$ | $W_{R9}$ | $W_{R11}$ | $W_{R13}$ | $W_{R15}$ | $W_{R8}$ | $W_{R10}$ | $W_{R12}$ | $W_{R14}$ | $W_{L9}$ | $W_{L11}$ | $W_{L13}$ | $W_{L15}$ |
| | 2 | $W_{L16}$ | $W_{L18}$ | $W_{L20}$ | $W_{L22}$ | $W_{R17}$ | $W_{R19}$ | $W_{R21}$ | $W_{R23}$ | $W_{R16}$ | $W_{R18}$ | $W_{R20}$ | $W_{R22}$ | $W_{L17}$ | $W_{L19}$ | $W_{L21}$ | $W_{L23}$ |
| | 3 | $W_{L24}$ | $W_{L26}$ | $W_{L28}$ | $W_{L30}$ | $W_{R25}$ | $W_{R27}$ | $W_{R29}$ | $W_{R31}$ | $W_{R24}$ | $W_{R26}$ | $W_{R28}$ | $W_{R30}$ | $W_{L25}$ | $W_{L27}$ | $W_{L29}$ | $W_{L31}$ |
| | 4 | $C_{L0}$ | $C_{L2}$ | $C_{L4}$ | $C_{L6}$ | $C_{R1}$ | $C_{R3}$ | $C_{R5}$ | $C_{R7}$ | $C_{R0}$ | $C_{R2}$ | $C_{R4}$ | $C_{R6}$ | $C_{L1}$ | $C_{L3}$ | $C_{L5}$ | $C_{L7}$ |
| | | $\ell_{L0}$ | $\ell_{L2}$ | $\ell_{L4}$ | $\ell_{L6}$ | $\ell_{R1}$ | $\ell_{R3}$ | $\ell_{R5}$ | $\ell_{R7}$ | $\ell_{R0}$ | $\ell_{R2}$ | $\ell_{R4}$ | $\ell_{R6}$ | $\ell_{L1}$ | $\ell_{L3}$ | $\ell_{L5}$ | $\ell_{L7}$ |

2 SCAN

FIG. 8

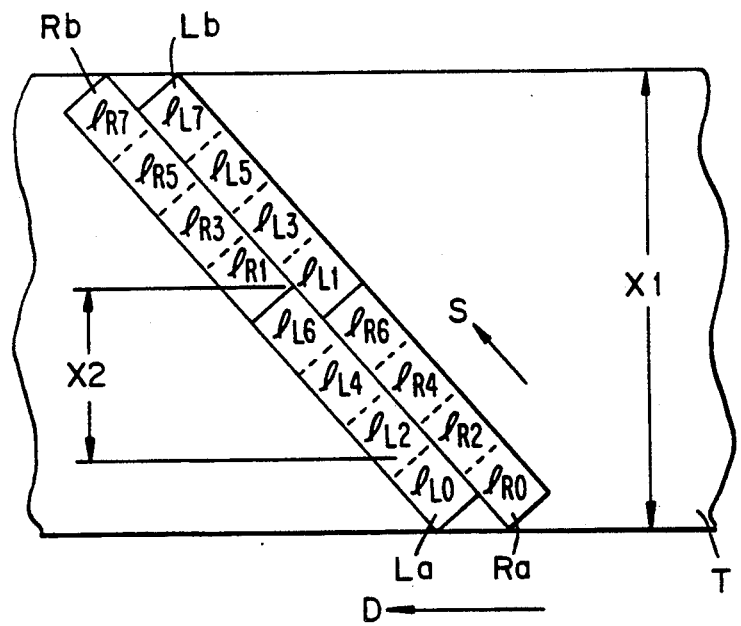

MAGNETIC RECORDER/REPRODUCER

This application is a continuation of application Ser. No. 07/486,499, filed Feb. 27, 1990, which is a continuation of Ser. No. 07/214,275 filed Jun. 30, 1988, now U.S. Pat. No. 4,905,100, which is a continuation of Ser. No. 19,612, filed Feb. 27, 1987, now U.S. Pat. No. 4,835,627, which is a continuation of Ser. No. 696,051, filed Jan. 29, 1985, now U.S. Pat. No. 4,675,754.

BACKGROUND OF THE INVENTION

1. Field of the Invention

The present invention relates to a magnetic recorder/reproducer. More specifically, it relates to a magnetic recorder/reproducer having rotary heads which converts analog signals into digital signals for slantingly or vertically scanning the same by the rotary heads thereby recording the digital signals in a magnetic tape and reproducing the same, and particularly to an improvement in interleaving of the data thereof.

2. Description of the Prior Art

Heretofore well known in the art is a rotary head-type PCM magnetic recorder/reproducer which converts audio signals into digital signals for recording the digital signals in a magnetic tape and reproducing the recorded digital signals. In general, a rotary head-type PCM magnetic recorder/reproducer employs error correction codes for correcting errors caused in the data upon recording/reproducing of the magnetic tape.

The error correction codes are adapted to correct the errors caused in the data following recording/reproducing of the magnetic tape thereby to reproduce high definition audio signals. However, when the number of the errors is beyond the correction ability to disable the error correction, compensation must be performed by means such as interpolation by taking the mean value of adjacent data. Further, most of the errors caused on the magnetic tape are burst errors, and hence the erroneous data are dispersed by interleaving processing for improving the ability of the error correction codes.

As hereinabove described, compensation processing is performed when the errors cannot be corrected, and mean value interpolation is employed as an effective compensation process with simple circuit structure. Such mean value interpolation is performed on condition that the adjacent data are correct.

Therefore, data of odd sample groups are separated as far as possible from those of even sample groups when the interleaving operation is performed.

FIGS. 1 and 2 show magnetization patterns recorded on a magnetic tape by a conventional rotary head-type PCM magnetic recorder/reproducer.

The following description is made of a rotary head-type PCM magnetic recorder/reproducer of a two-head helical scanning system, which is taken as a typical example.

In FIGS. 1 and 2, a magnetic tape T travels in the direction indicated by an arrow D and is scanned by rotary heads in the direction indicated by an arrow S. The data recorded in the magnetic tape T are of two channels A and B, and distributed into even sample groups a and odd sample groups b. For example, symbol a with symbol A+B indicates even sample groups of the channels A and B, and symbol Aa indicates an even sample group of the channel A.

The volume of interleaving is generally determined in consideration of burst length of errors and correction ability of error correction codes, and an even sample group a and an odd sample group b may be in line over a scanning interval as shown in FIG. 1 or to the contrary.

FIG. 2 shows the even sample groups a and the odd sample groups b arrayed in equally divided scanning intervals. In the interleaving operation performed in this manner, errors are caused in continuous data when one of the rotary heads is instantaneously silted by magnetic powder coming off from the magnetic tape T, i.e., when the reproduced signals from one of the rotary heads are interrupted. Thus, it has been impossible to perform the mean value interpolation, which causes harsh noise.

SUMMARY OF THE INVENTION

Accordingly, an essential object of the present invention is to provide a magnetic recorder/reproducer which can reduce noise caused by a silted rotary head and by errors in the tape travelling direction over a certain width along the cross direction of a magnetic tape.

A further object is to provide a magnetic tape wherein data is recorded on a plurality of channels in a predetermined pattern.

In one aspect of the invention, there is provided a magnetic recorder/reproducer which performs a coding operation so that error correction codes are completed in one scanning interval and effectively reproduces signals even if a rotary head is silted or a burst error is caused in the tape travelling direction over a certain width, thereby to prevent an increase in the clock rate required for error correction.

In another aspect of the invention there is provided a magnetic tape on which data is recorded in a plurality of channels in accordance with a predetermined pattern.

In summary, the present invention converts analog signals of a plurality of channels into digital signals to distribute the digital signals of the plurality of channels into odd sample groups and even sample groups per each channel, and permutates the sample groups so that the odd sample groups and the even sample groups of the same channel are recorded in alternate scanning intervals in positions separated along the direction of scanning thereby to record the permutated odd sample groups and the even sample groups of the respective channels in a magnetic recording medium by magnetic heads.

Therefore, according to the present invention, the signals may be readily corrected even if reproduced signals from one head are interrupted by, e.g., instantaneous silting of the head caused by magnetic powder coming off from the magnetic tape or by a burst error caused in the tape travelling direction over a wide range along the cross direction of the tape, whereby the signal-to-noise ratio of reproduced sounds or images can be improved. Further, excellent reproduced sounds and images can be obtained by properly selecting samples from the respective groups.

In a preferred embodiment of the present invention, even sample groups of a first channel and odd samples group of a second channel are arrayed in the same scanning intervals while odd sample groups of the first channel and even sample groups of the second channel are arrayed in scanning intervals adjacent to the said same scanning intervals, such that the odd sample groups and the even sample groups of the first channel are recorded in positions separated from each other along the direction of scanning. Or, the even sample groups of the first channel and the even sample groups of the second channel may be arrayed in the same scanning intervals while the odd sample groups of the first channel and the odd sample groups of the second channel are arrayed in scanning intervals adjacent to the said same scanning intervals in such a manner that the odd sample groups and the even sample groups of the first channel are recorded in positions separated along the direction of scanning.

In a second aspect of the present invention, the respective sample groups recorded in the magnetic tape in the aforementioned manner are reproduced by magnetic heads to be permutated in order of sample numbers per each channel and outputted to be converted into analog signals.

In a third aspect of the present invention, the permutated odd sample group and even sample group of each channel in each scanning interval are encoded to generate error correction codes, which are arrayed in the scanning interval including information employed for generating the error correction codes to be recorded.

Therefore, according to the present invention, the error correction codes are so generated and arrayed as to be completed with respect to the data included in one scanning interval, thereby to prevent increase in the clock rate required for encoding and decoding of the data.

The above and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an illustration showing respective sample groups stored in a memory circuit as shown in FIG. 5;

FIG. 8 illustrates a magnetization pattern showing frame array recorded in the memory circuit as shown in FIG. 7;

DESCRIPTION OF THE PREFERRED EMBODIMENTS

Figure 1:
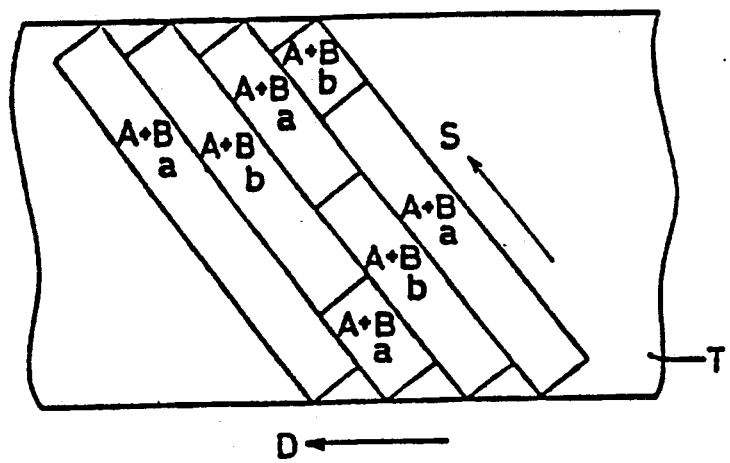
FIGS. 1 and 2 are illustrations showing conventional magnetization patterns.
Figure 2:
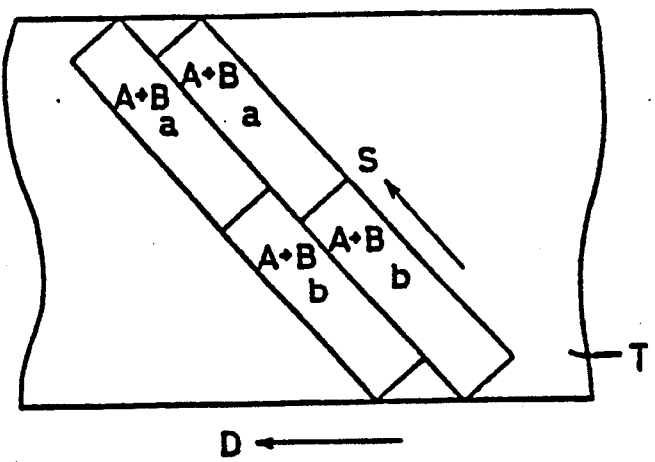
Figure 3:
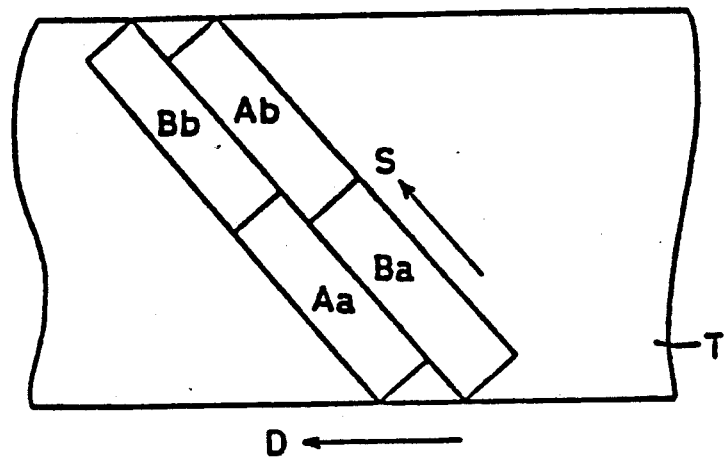
FIGS. 3 and 4 are illustrations showing magnetization patterns according to an embodiment of the present invention.

FIG. 3 is an illustration showing a magnetization pattern recorded on a magnetic tape in an embodiment of the present invention. The principle of the present invention is now described with reference to FIG. 3. In a rotary head-type magnetic recorder/reproducer according to the present invention, interleaving processing is characterized in that even sample groups and odd sample groups of the same channel are arrayed in alternate scanning intervals in positions separated from each other along the direction of scanning by rotary heads. By virtue of such array, at least either the even sample groups or the odd sample groups of the same channel can necessarily be obtained even if signals in one of two rotary heads are interrupted by the aforementioned silting, and hence no continuous sample errors are caused. Further, with respect to a burst error caused along the tape travelling direction in a certain width from the edge of the magnetic tape, either the even sample groups or the odd sample groups of the same channel can be obtained to half the width of the magnetic tape in the cross direction as shown in FIG. 3, whereby no continuous sample errors are caused in the same channel.

Figure 4:
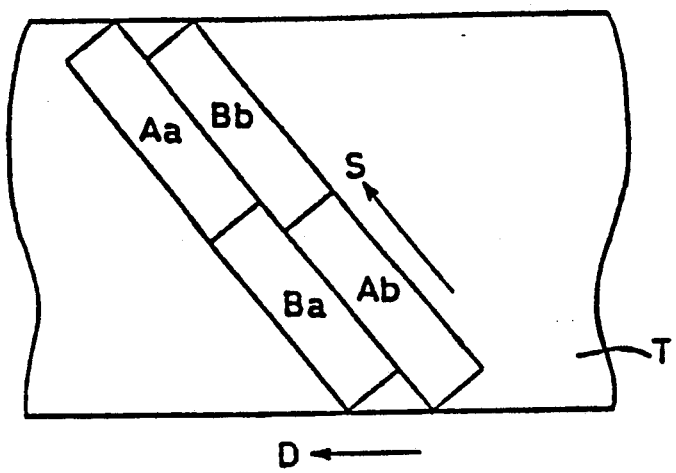

FIG. 4 is an illustration showing another example of the magnetization pattern. Also in the example as shown in FIG. 4, even sample groups and odd sample groups of the same channel are arrayed in alternate scanning intervals in positions separated from each other along the direction of scanning, and hence no sample errors are caused by interruption of signals similarly to the example as shown in FIG. 3.

Figure 6:
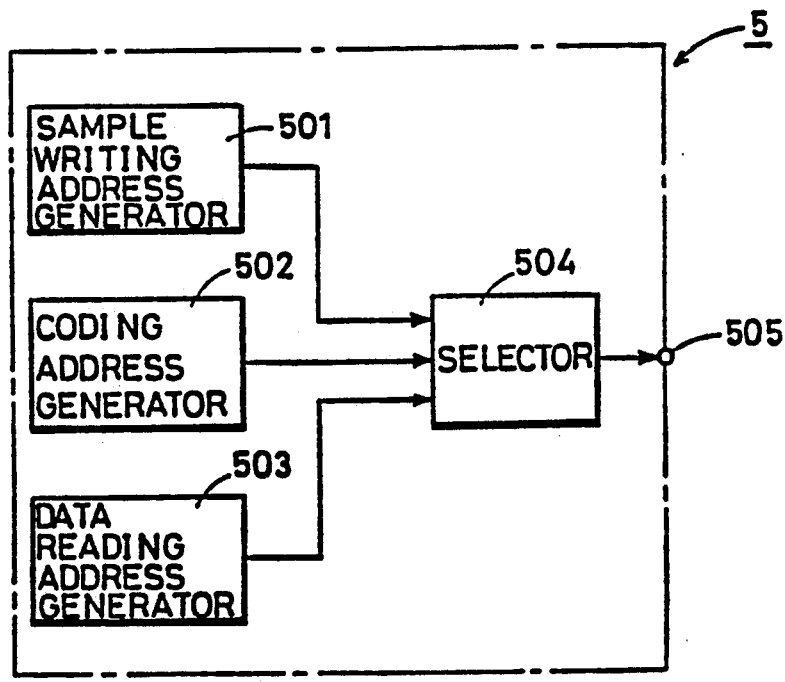
FIG. 6 is a roughly illustrated block diagram showing a memory address control circuit as shown in FIG. 5.
Figure 5:
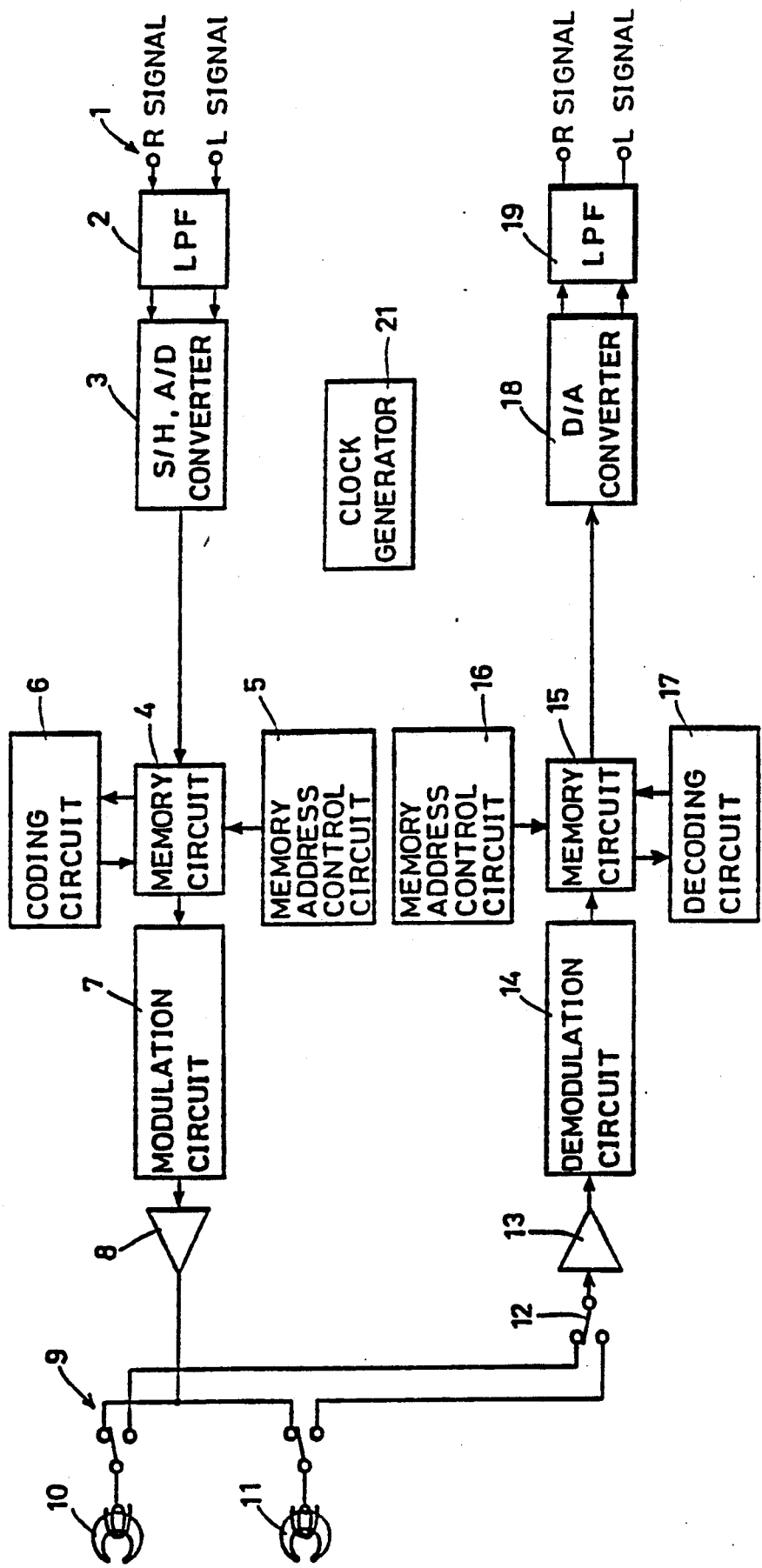
FIG. 5 is a roughly illustrated block diagram showing an embodiment of the present invention.

FIG. 5 is a roughly illustrated block diagram showing an embodiment of the present invention and FIG. 6 is a roughly illustrated block diagram showing a memory address control circuit as shown in FIG. 5.

Description is now made on structure of the present embodiment with reference to FIGS. 5 and 6. A rotary head-type PCM magnetic recorder/reproducer consists of a recording system and a reproducing system. A two-channel input terminal 1 of the recording system receives analog audio signals. The analog audio signals inputted in the input terminal 1 are supplied to a low-pass filter 2 to be band-restricted. Then the analog audio signals passed through the low-pass filter 2 are inputted to a sample-and-hold/A-D converter circuit 3. The sample-and-hold/A-D converter circuit 3 converts the analog audio signals into digital signals. The digitally converted signals are supplied to a memory circuit 4 to be stored therein. The memory circuit 4 is address-controlled by a memory address control circuit 5.

As shown in FIG. 6, the memory address control circuit 5 is formed by a sample writing address generator circuit 501, a coding address generator circuit 502, a data reading address generator circuit 503 and a selector 504 which receives respective outputs from the sample writing address generator circuit 501, the coding address generator circuit 502 and the data reading address generator circuit 503 for making selective outputs at an address output terminal 505. A coding circuit 6 is provided in relation to the memory circuit 4. The coding circuit 6 generates codes for correcting and detecting errors in the digital signals stored in the memory circuit 4. The digital signals read from the memory circuit 4 are supplied to a modulation circuit 7 to be modulated by the same. The modulated digital signals are amplified by a recording amplifier 8, to be supplied to either a rotary head 10 or 11 which is selected by a first selection switch 9.

The digital signals reproduced by the rotary heads 10 and 11 are inputted through a second selection switch 12 for selecting the rotary head 10 or 11 in a reproducing amplifier 13. The reproducing amplifier 13 amplifies the reproduced digital signals to supply the same to a demodulation circuit 14. The demodulation circuit 14 demodulates the reproduced digital signals, to supply the demodulated outputs to a memory circuit 15. The memory circuit 15 is connected with a memory address control circuit 16, which controls addresses of the memory circuit 15. The memory circuit 15 is further connected to a decoding circuit 17. The decoding circuit 17 is adapted to correct and detect errors in the reproduced digital signals. The reproduced digital signals read from the memory circuit 15 are supplied to a D-A converter circuit 18, to be converted into analog signals. The converted analog signals are outputted at an output terminal 20 through a low-pass filter 19.

Operation in the recording system is now described. The input terminal 1 receives analog audio signals of left and right channels, which are respectively band-restricted by the low-pass filter 2. The outputs from the low-pass filter 2 are supplied to the sample-and-hold/A-D converter circuit 3, to be converted into digital signals $W_{Ln}$ and $W_{Rn}$. Symbol n represents order of sampling, and the analog signals of the left and right channels are subsequently sampled to be alternately outputted as digital signals $W_{L0}$, $W_{R0}$, $W_{L1}$, $W_{R1}$, $W_{L2}$, $W_{R2}$, .... The digital signals $W_{Ln}$ and $W_{Rn}$ are supplied to the memory circuit 4 to be subsequently written in the same with memory addresses being controlled by the sample writing address generator circuit 501 of the address control circuit 5 provided in relation to the memory circuit 4. The address control operation is hereinafter described in detail.

The coding circuit 6 provided in relation to the memory circuit 4 reads necessary samples included in the digital signals stored in the memory circuit 4 for generating error correction codes and again writing the same in the memory circuit 4. The digital signals and the error correction codes are subsequently read by the address control circuit 5. The read digital signals are inputted to the modulation circuit 7, to be converted into signals appropriate for recording in the magnetic tape. The converted signals are amplified by the recording amplifier 8, to be recorded in the magnetic tape by the two rotary heads 10 and 11 through the first selection switch 9. The first selection switch 9 is adapted to switch the circuits to be connected with the rotary heads 10 and 11 in recording and reproducing of the signals.

Operation in the reproducing system is now described. The reproduced digital signals read from the two rotary heads 10 and 11 are supplied to the second selection switch 12 through the first selection switch 9. The second selection switch 12 is adapted to supply the signals read from the rotary heads 10 and 11 to the reproducing amplifier 13 as single-system signals. The reproduced digital signals are amplified by the reproducing amplifier 13, to be supplied to the demodulation circuit 14. The demodulation circuit 14 demodulates the reproduced digital signals to those before modulation, to supply the same to the memory circuit 15. The memory circuit 15 is address-controlled by the memory address control circuit 16, to write the reproduced digital signals. The decoding circuit 17 provided in relation to the memory circuit 15 reads necessary samples from the memory circuit 15 to correct and detect errors. The corrected samples in the memory circuit 15 are subsequently read therefrom by the memory address control circuit 16, to be supplied to the D-A converter circuit 18. The D-A converter circuit 18 converts the digital signals into analog signals, to supply the same to the low-pass filter 19. The low-pass filter 19 performs band restriction of the analog signals, to output the same from the output terminal 20.

A clock generator circuit 21 is adapted to generate clock pulses required for the respective components of the recording and reproducing systems.

In relation to the memory circuits 4 and 15 as shown in FIG. 5, description is now made of means for performing the aforementioned data interleaving operation employed in the rotary head-type PCM magnetic recorder/reproducer according to the present invention.

FIG. 7 is an illustration showing an example of samples stored in the memory circuit as shown in FIG. 5. In FIG. 7, the magnetic heads 10 and 11 respectively record 32 samples in the left and right channels respectively during an interval for scanning the magnetic tape. Numerals in the lateral direction indicate column unit memory addresses (hereinafter referred to as "frame addresses") and numerals in the vertical direction indicate row unit memory addresses (hereinafter referred to as "sample addresses").

In the recording system, the A-D converted and subsequently supplied samples $W_{L0}$, $W_{R0}$, $W_{L1}$, $W_{R1}$, ... are written in the memory circuit 4 with addresses controlled by the address control circuit 5 to be in the array as shown in FIG. 6. In other words, the samples are subsequently written in the memory circuit 4 with sample address being set at 0 and the frame address being set at 0, 8, 12, 4, .... When the frame address come to 7 and the sample $W_{R7}$ is written in the memory circuit 4, the sample address is updated by 1 so that a given number of samples are written in the memory circuit 4 with the frame addresses being again controlled. The samples are thus arrayed in the form of a matrix of $4 \times 16$, wherein even sample groups and odd sample groups of the respective channels are separated from each other. With respect to the sample matrix thus formed, the coding circuit 6 as shown in FIG. 5 performs encoding of the samples read by the coding address generator circuit 502 of the memory address control circuit 5, whereas explanation of such encoding operation is omitted since the same is not the substance of the present invention. It is to be noted that codes $C_{Ln}$ and $C_{Rn}$ are utilized as error correction codes in the frame units.

The data reading address generator circuit 503 of the memory address control circuit 5 subsequently reads the samples from the memory circuit 4 in the unit of frames with four vertical samples and one error correction word processed as one frame. In other words, the memory address control circuit 5 sets the frame address at 0 and subsequently updates the sample address as 0, 1, 2, ..., and when an error correction word is read at the sample address of 4, it updates the frame address by 1 to read the samples. The data up to a frame address of 7 are arrayed in one scanning interval, and scanning of all the data in the memory circuit 4 is completed by performing the operation for two scanning intervals.

The data thus read from the memory circuit 4 are in the magnetization pattern as shown in FIG. 8 on the magnetic tape, and are arrayed as shown in FIG. 3. In the signals recorded in the aforementioned manner, no continuous error takes place even if a burst error is caused by interruption of signals in one scanning interval or in the tape travelling direction in half the width of the magnetic tape from the edge thereof, and hence compensation by mean value interpolation is enabled.

The aforementioned operation for controlling the addresses in writing of the samples in the memory circuit 4 may appropriately be changed for obtaining the magnetization pattern as shown in FIG. 4.

As hereinabove described, the present embodiment is characterized in that even samples and odd samples are permutated in groups and in that the samples in the respective groups are recorded in positions separated along the scanning direction from those in continuity therewith, as shown in FIG. 8. For example, with respect to a frame $1_{L2}$ including a sample $W_{L2}$, frames $1_{L1}$ and $1_{L3}$ including data $W_{L1}$ and $W_{L3}$ which are in continuity with the sample $W_{L2}$ are arrayed in positions separated from the frame $1_{L2}$ along the direction of scanning in FIG. 8. More specifically, the data $W_{L2}$ and $W_{L1}$ are separated from each other by a distance $X_2$, and no continuous sample error is caused due to a burst error in the tape travelling direction in a width smaller than the length $X_2$.

Assuming that $\alpha$ frames are recorded in one scanning interval, the distance $X_2$ is found as follows:

$$X_2 = (\alpha/2 - 1)X_1/\alpha$$

In practice, 200 to 300 frames are generally recorded in one scanning interval, and hence $X_2 \simeq X_1/2$, and hence no continuous sample error takes place even if an error is caused in the tape travelling direction in about half the width of the magnetic tape. Further, as hereinabove described, no continuous sample error takes place by signal interruption caused in one scanning interval, and hence compensation by means value interpolation is enabled.

Figure 9:
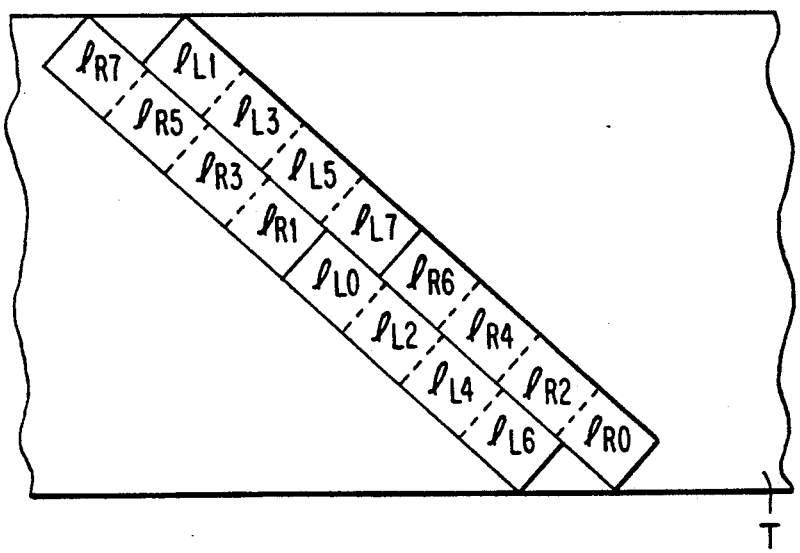
FIG. 9 is an illustration showing a magnetization pattern according to another embodiment of the present invention.

FIG. 9 is an illustration showing another example of the sample array. Although frame arrangement of the left channel in the sample array as shown in FIG. 9 is different in order from that shown in FIG. 8, a similar effect can be obtained by such array as a matter of course. The magnetization pattern as shown in FIG. 9 can be implemented by simply changing the address control circuits 5 and 16 as shown in FIG. 5.

Figure 11:
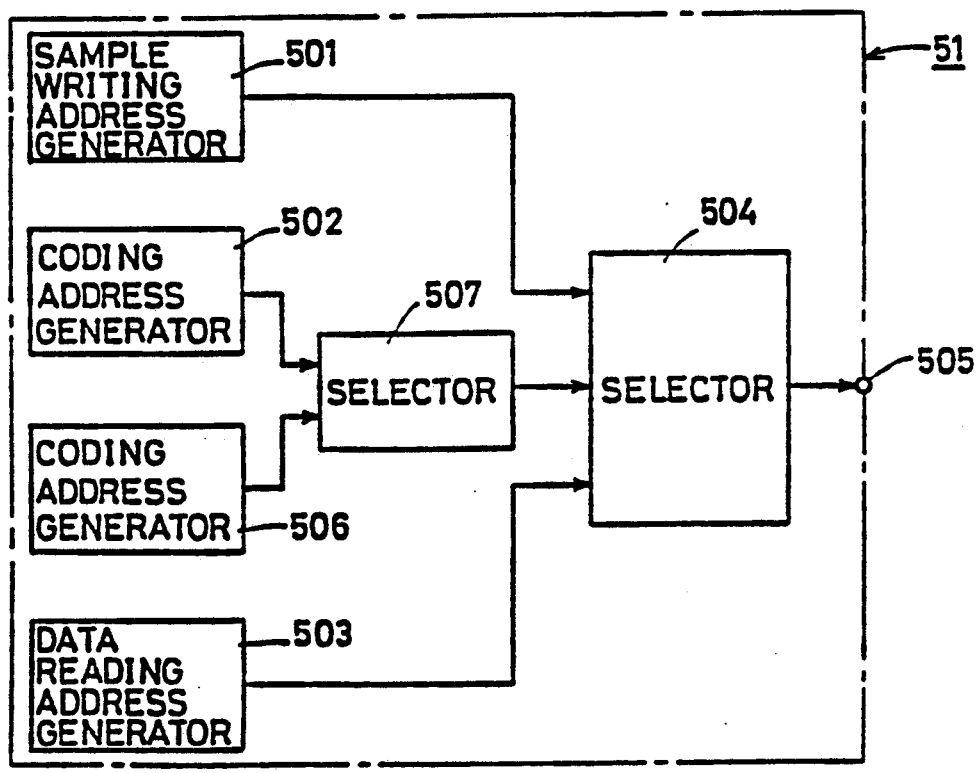
FIG. 11 is a roughly illustrated block diagram showing a memory address control circuit as shown in FIG. 10.
Figure 10:
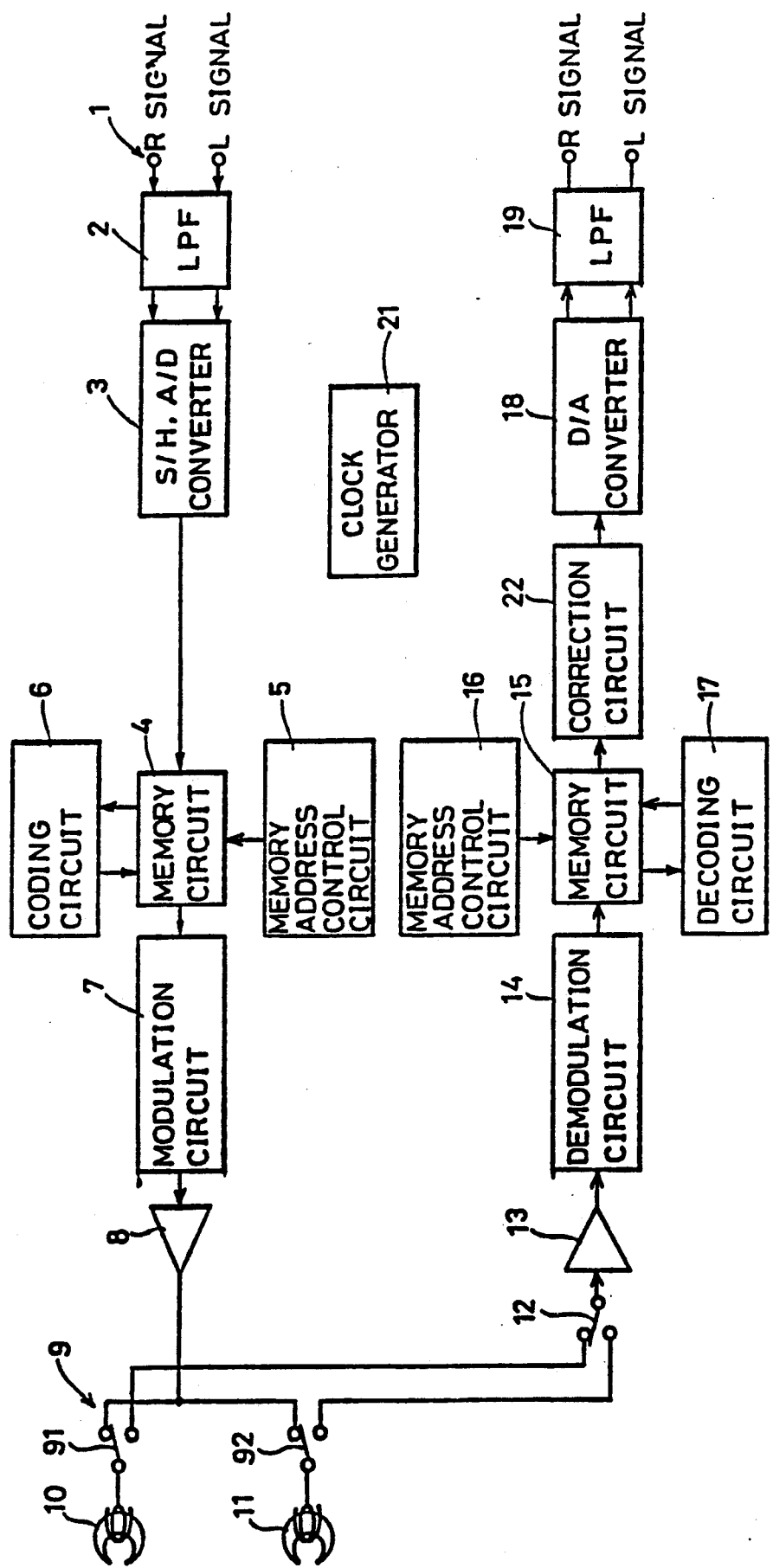
FIG. 10 is a roughly illustrated block diagram showing another embodiment of the present invention.

FIG. 10 is a block diagram showing another embodiment of the present invention, and FIG. 11 is a roughly illustrated block diagram of a memory address control circuit as shown in FIG. 10. A rotary head-type PCM magnetic recorder/reproducer as shown in FIG. 10 is substantially identical to that shown in FIG. 5 except that a correction circuit 22 is provided between the memory circuit 15 and the D-A converter circuit 18 of the reproducing system and that a memory address control circuit 51 is structured as shown in FIG. 11. The correction circuit 22 is adapted to perform correction by the aforementioned mean value interpolation of samples not corrected though errors are detected.

The memory address control circuit 51 comprises a sample writing address generator circuit 501, a first coding address generator circuit 502, a data reading address generator circuit 503, a second coding address generator circuit 506, a second selector 507 for receiving and selectively outputting the outputs from the first and second coding address generator circuits 502 and 506 and a first selector 504 for receiving the outputs from the sample writing address generator circuit 501, the data reading address generator circuit 503 and the second selector 507 and selectively outputting the same at an address output terminal 505.

Figure 12:
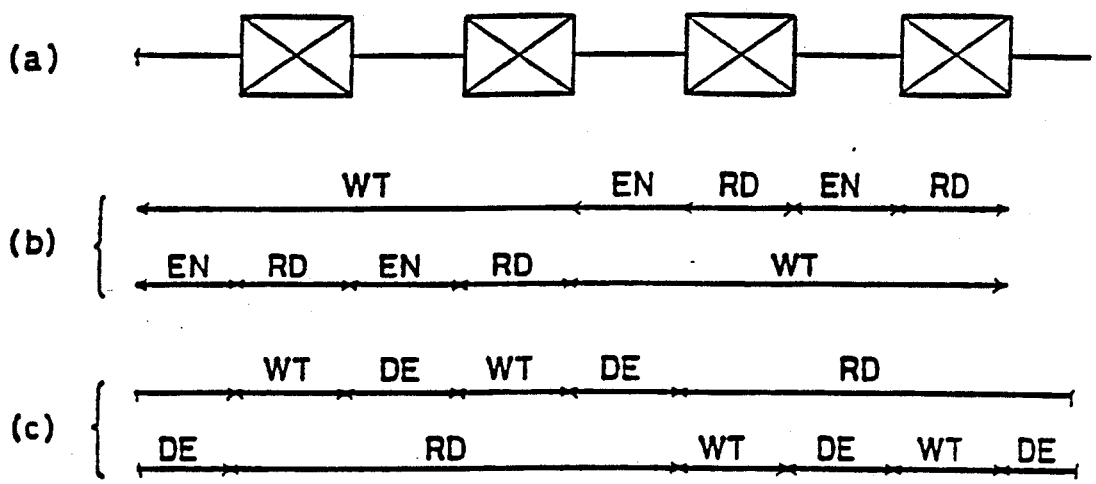
FIG. 12 consisting of A through C is a timing chart showing operation of the memory circuits as shown in FIG. 10.

FIG. 12 is a timing chart showing operation of the memory circuits as shown in FIG. 10. In FIG. 12, the rotary head-type PCM magnetic recorder/reproducer performs two-head recording/reproducing operation by 90° tape winding, and hence signal recording/reproducing intervals of 90° and pause intervals of 90° alternately appear in the recorded/reproduced waveforms as shown in FIG. 12(a). In other words, a signal recording/reproducing interval of 90° corresponds to recording/reproducing operation in one scanning interval. Within signals for two scanning intervals sampled in a writing interval WT to the memory circuit 4 as shown in FIG. 12(b), signals for one scanning interval to be read in a reading interval RD for subsequent reading from the memory circuit 4 are encoded in an encoding interval EN to be read in the reading interval RD. Then the signals for the remaining scanning interval are encoded in the subsequent encoding interval EN, to be read in the reading interval RD.

Shown in FIG. 12(c) is the operation of the memory circuit 15 in a reproducing operation. In the writing interval WT, the reproduced sample signals for one scanning interval are written in the memory circuit 15, and are decoded in a subsequent decoding interval DE to be written in the memory circuit 15. Then the sample signals for the remaining scanning interval are written in the memory circuit 15 in the subsequent writing interval WT, to be decoded in the subsequent decoding interval DE. The decoded samples for two scanning intervals are read in the reading interval RD. In recording operation, the samples supplied as $W_{L0}$, $W_{R0}$, $W_{L1}$, ... are subjected to memory address control by the sample writing address generator circuit 501 of the memory address control circuit 51 and written in the memory circuit 15, to be in the array as shown in FIG. 12.

Figure 13:
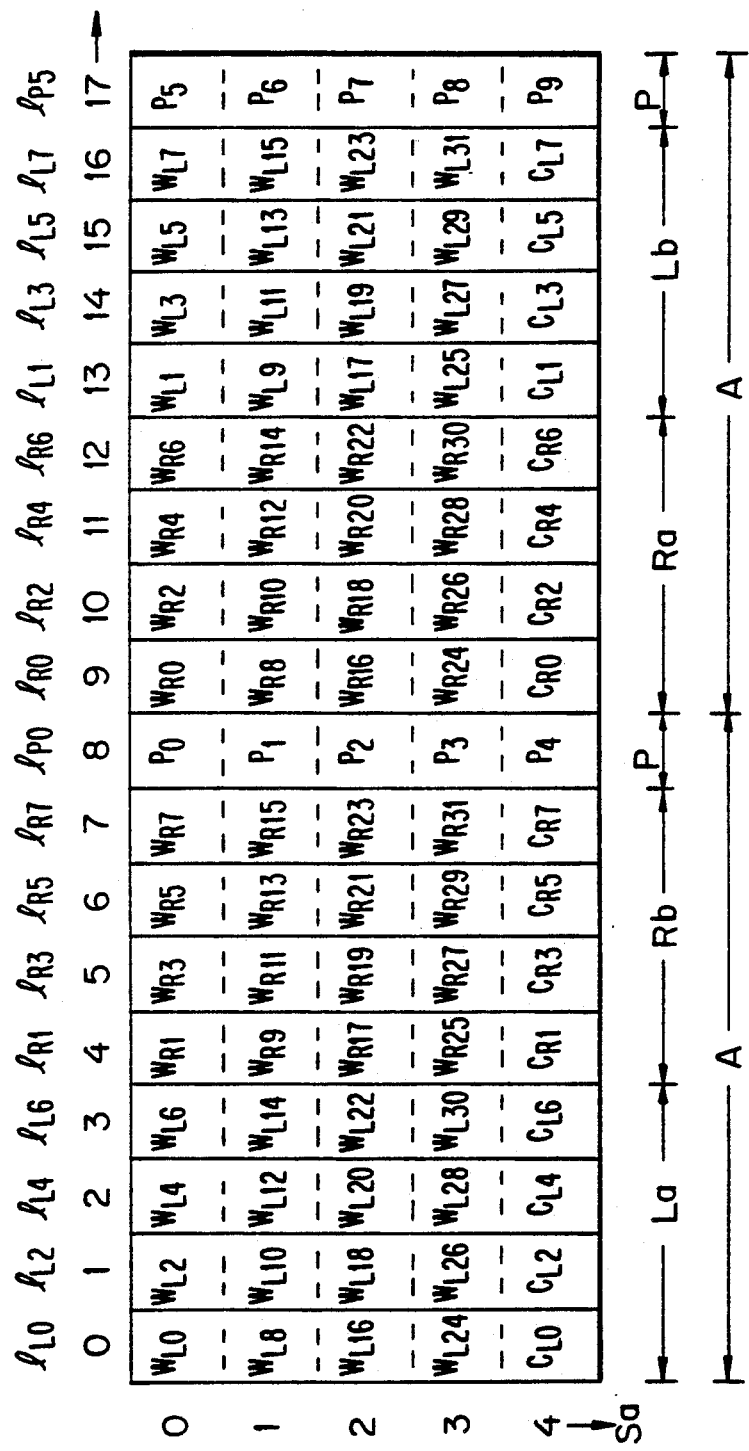
FIG. 13 is an illustration showing sample groups stored in the memory circuit as shown in FIG. 10.

FIG. 13 is an illustration showing an example of samples stored in the memory circuits as shown in FIG. 10. FIG. 13 is different from FIG. 7 in that 26 words are stored as error correction codes in addition to 32 samples of the left and right channels as data for two scanning intervals.

Operation of another embodiment of the present invention is now described with reference to FIG. 13. Encoded first are samples $1_{L0}$, $1_{L2}$, $1_{L4}$, $1_{L6}$, $1_{R1}$, $1_{R3}$, $1_{R5}$ and $1_{R7}$ to be recorded in the form of a matrix of $8 \times 4$. Then the second coding address generator circuit 506 generates error correction codes $P_0$ to $P_4$, and then generates error correction codes $C_{L0}$, $C_{L2}$, $C_{L4}$, $C_{L6}$, $C_{R1}$, $C_{R3}$, $C_{R5}$ and $C_{R7}$ with respect to samples read by the first coding address generator circuits 502. The encoded data of frame addresses of 0 to 8 are subsequently read in order of frame numbers by the data reading address generator circuit 503 of the memory address control circuit 51 in frame units, with a frame $P_0$ of the error correction code being read after a frame number 3 to be inserted between intervals La and Rb, thereby recorded in the magnetic tape.

After reading of the samples for one scanning interval is completed, the samples for the remaining scanning interval are similarly encoded to be recorded in the adjacent scanning interval. Although continuous samples in the respective groups are thus distributed in two scanning intervals, the error correction codes are completed with respect to data for one scanning interval to be recorded in the magnetic tape, and are not extended over two scanning intervals.

In a reproducing operation, the data are written in the memory circuit 15 in frame units contrary to the recording operation, are corrected by the error correction codes, and subsequently are read as $W_{L0}$, $W_{R0}$, $W_{L1}$, .. . The error correction codes are completed in one scanning interval as hereinabove described, and hence the samples can be decoded upon reading of the data for one scanning interval. This operation is identical to that hereinabove described with reference to FIG. 12, and since data for two scanning intervals are gathered in codes extended over two scanning intervals, the data must be decoded with respect to two scanning intervals in the subsequent decoding interval of 90°. However, the data are decoded per scanning interval in the present embodiment, and hence the clock rate required for encoding and decoding of the data is not increased by data interleaving for two scanning intervals.

Figure 14:
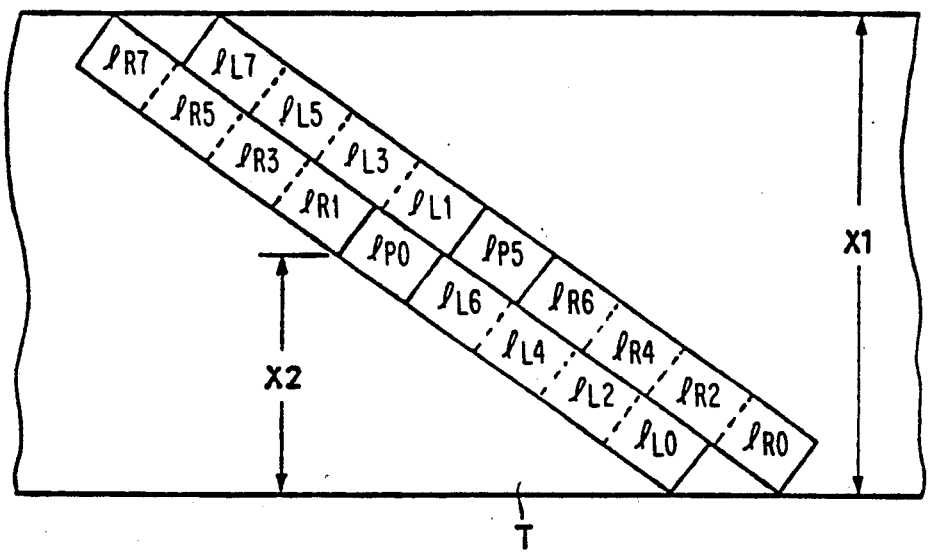
FIG. 14 illustrates a magnetization pattern showing frame array recorded by the sample groups as shown in FIG. 13.

FIG. 14 illustrates the magnetization pattern recorded on the magnetic tape by the memory circuit structure as shown in FIG. 13. In FIG. 14, symbol $X_1$ indicates the width of the magnetic tape and symbol $X_2$ indicates the width of the burst error capable of correction by mean value interpolation. In the example as shown in FIG. 14, reading addresses in recording operation are so controlled that frames $1_{F0}$ and $1_{F5}$ of error correction codes are located in the middle of one scanning interval, although the frames $1_{F0}$ and $1_{F5}$ may be located in any position of the scanning interval.

As hereinabove described, no continuous sample errors are caused in the magnetization pattern as shown in FIG. 14 even if the signals are interrupted for one scanning interval and a burst error is caused in the tape travelling direction in half the tape width from the edge of the magnetic tape, whereby mean value interpolation is enabled.

Figure 15:
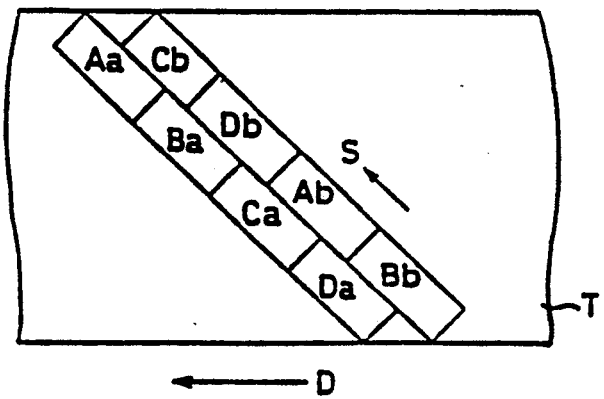
FIG. 15 is an illustration showing a magnetization pattern according to still another embodiment of the present invention.

FIG. 15 illustrates a magnetization pattern according to still another embodiment of the present invention. The magnetization pattern as shown in FIG. 15 is applied to four channels A, B, C and D. Also in the case of four channels, no continuous sample errors are caused in the respective channels even if the signals are interrupted for one scanning interval and a burst error is caused in the tape travelling direction in half the tape width from the edge of the magnetic tape, whereby mean value interpolation is enabled similarly to the case of two channels.

Although each of the above embodiments has been described with respect to a rotary head type PCM magnetic recorder/reproducer which processes audio signals, the present invention may, needless to say, be applied to a device for processing signals correctable by mean value interpolation such as video signals, and further to digital signal recording/reproducing systems other than the PCM system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a magnetic recording/reproducing apparatus converting N (N is an integer no less than 2) channels of analog signals into digital signals recorded on a plurality of tracks, the apparatus having a rotary head for recording said digital signals on a magnetic tape such that at least N regions including first to N-th regions are formed in each track,
   an A-D converter for converting analog signals into digital signals; and
   first memory means for storing in a predetermined order digital signals outputted from the A-D converter, the improvement comprising:
   first memory address controlling means for reading digital signals stored in the first memory means such that, in recording as a unit on first and second tracks samples of said digital signals outputted in a prescribed time period from said A-D converter for separate ones of a plurality of channels, either even-numbered samples or odd-numbered samples outputted from the first memory means representing a K-th ($1 \leq K \leq N$) channel are recorded in a K-th region of the first track and the remaining samples outputted from the first memory means for said Kth channel are recorded on the second track in a region other than the K-th region thereof;
   coding means for generating redundant signals for correcting or detecting an error, said coding means generating said redundant signals from the digital signals to be recorded on one track and causing said redundant signals to be recorded on the same one track as the digital signals used for generating the redundant signals;
   a plurality of heads for recording the digital signals outputted from said first memory means and the redundant signals generated by said coding means on said magnetic tape or for reproducing signals recorded on said magnetic tape;
   second memory means for storing signals reproduced by said heads;
   decoding means for correcting or for detecting an error of the signals stored in the second memory means;
   second memory address controlling means for controlling addresses of said second memory means such that the samples are read from said second memory means in the same order as the order of samples represented by said digital signals outputted by said A-D converter;
   compensating means for replacing an erroneous and uncorrected sample with an approximate value obtained from correct samples outputted from said second memory means before and after the erroneous sample; and
   a D-A converter for converting digital signals into analog signals.

2. A recording and reproducing apparatus according to claim 1, wherein
   said N channels comprise first and second channels, said samples included in one unit are recorded on the first and second tracks,
   said first memory address controlling means includes means for controlling read addresses of said first memory means such that even-numbered samples and the odd-numbered samples of the first channel are recorded separately, on a former half region of the first track and on a later half region of the second track, respectively, and such that even-numbered samples and odd-numbered samples of the second channel are separately recorded, on the later half region of the first track and the former half region of the second track, respectively.

3. A magnetic recording and reproducing method for converting analog signals of N (N is an integer no less than 2) channels into digital signals recorded on a plurality of tracks, and for recording and reproducing said digital signals on a magnetic tape by using a rotary head such that at least N regions including first to N-th regions are formed in each track, comprising the steps of (a) writing digital signals, including even-numbered samples and odd-numbered samples outputted in a predetermined order from an A-D converter, in a prescribed region of a recording memory;

(b) generating a code for correcting or detecting an error in a signal recorded in one track by successively reading digital signals from said recording memory;

(c) in recording as a unit on first and second tracks, N channels of samples of said digital signals outputted from the A-D converter, reading and recording on said magnetic tape said digital signals stored in said memory such that either even-numbered samples or odd-numbered samples of a K-th ($1 \leq K \leq N$) channel are recorded in a K-th region of the first track and the remaining samples are recorded on the second track in a region other than the K-th region thereof;

(d) writing N channels of digital signals reproduced from said magnetic tape in a prescribed region of said memory;

(e) correcting or detecting an error in the signals stored in said memory;

(f) reading samples stored in said memory such that the even-numbered samples and the odd-numbered samples of each channel of each unit are in the same order as the order of samples outputted from said A-D converter; and (g) replacing an erroneous and uncorrected sample out of said read even-numbered samples and odd-numbered samples by a mean value of correct sample, before and after the erroneous sample.

4. A magnetic recording and reproducing method according to claim 3, wherein said N channels comprise first and second channels, all samples included in one unit are recorded on the first and second tracks, the even-numbered samples and the odd-numbered samples of said first channel are separately recorded on a former half region of the first track and on a later half region of the second track, respectively, and the even-numbered samples and the odd-numbered samples of the second channel are separately recorded on the later half region of the first track and the former half region of the second track, respectively.

5. A recording and reproducing apparatus according to claim 1, wherein said first memory address controlling means is operable for recording as a unit samples of said digital signals outputted during a complete rotation of said rotary head.

6. A recording and reproducing apparatus according to claim 1, wherein said first memory address controlling means is operable for recording even samples and odd samples of each channel on different tracks.

7. A rotary head type magnetic recording reproducing apparatus for recording and reproducing two channels, including first and second channels of digital signals on a recording medium while forming slanting tracks thereon, comprising:

coding means for generating redundant signals for error control by encoding digital signals arranged on one of said tracks;

signal processing means for separating samples of each of said first and second channels inputted in a unit time into even numbered input samples and odd numbered input samples, for rearranging the samples such that all the samples of said two channels are arranged in two tracks, including first and second tracks, and that the even numbered samples and odd numbered samples of the same channel are recorded on different ones of said first and second tracks on positions spaced apart from each other in longitudinal direction of the tracks, and for supplying said digital signals and said redundant signals such that all the redundant signals are included in the track including the digital signals from which said redundant signals are generated;

recording means for successively recording the digital signals and the redundant signals supplied by said signal processing means on the recording medium;

reproducing means for scanning tracks recorded on the recording medium for reproducing said two channels of digital signals; and reproduced signal processing means receiving signals supplied from said reproducing means for rearranging an order of the samples from two tracks to recover the original order of the samples in each channel; wherein each of said tracks comprises at least a first region positioned to include the center of the track, and second and third regions positioned on both sides of the first region, and said signal processing means comprises means for arranging the even numbered samples of the first channel to be recorded in the second region of said first track, for arranging the odd numbered samples of said second channel to be recorded on the third region of said first track, for providing the same sample order to the even numbered samples of said second channel in the second region of said second track as to the even numbered samples of said first channel, for providing the same sample order to the odd numbered samples of said first channel in the third region of said second track as to the odd numbered samples of said second channel, and for arranging at least part of said redundant signals for error correction for the digital signals of the first track to be recorded on and reproduced from the first region of the first track, and for arranging at least part of said redundant signals for the digital signals of the second track to be recorded on and reproduced from the first region of the second track.

8. A rotary head type magnetic recording apparatus for recording two channels, including first and second channels of digital signals on a recording medium while forming slanting tracks, comprising:

coding means for encoding digital signals arranged in one of said tracks for generating redundant signals for error control;

signal processing means for separating samples of said two channels inputted in a unit time to even numbered input samples and odd numbered input samples, for rearranging the samples such that all the samples of said two channels are arranged in two tracks including first and second tracks and that even numbered samples and odd numbered samples of the same channel are recorded on different ones of said two tracks and at positions spaced apart from each other in longitudinal direction, and for supplying said digital signals and said redundant signals so as to include all redundant signals in the track including the digital signals from which said redundant signals are generated; and recording means for successively recording the digital signals and the redundant signals supplied from said signal processing means on the recording medium; wherein each of said tracks comprises at least a first region positioned to include the center of the track and second and third regions positioned on both sides of the first region, and said signal processing means comprises means for arranging the even numbered samples of said first channel to be recorded on the second region of said first track, arranging the odd numbered samples of said second channel to be recorded on the third region of said first track, the even numbered samples of said second channel to be recorded in the second region of said second track in the same sample order as the even numbered samples of said first channel, and arranging the odd numbered samples of said first channel to be recorded on the third region of said second track in the same sample order as the odd numbered samples of said second channel, and for arranging at least part of the redundant signals for error control for the digital signals of the first track to be recorded on the first region of the first track, and arranging at least part of said redundant signals for the digital signals of said second track to be recorded on the first region of the second track.

9. A rotary head type magnetic reproducing apparatus for reproducing two channels, including first and second channels of digital signals while successively scanning slanting tracks formed on a recording medium, the digital signals of each channel represented by odd and even samples having an original order, each of said tracks comprising at least a first region including the center of the track and second and third regions on both sides of the first region, respectively, wherein even numbered samples of said second channel are arranged in the same sample order as even numbered samples of said first channel and odd numbered samples of said first channel are arranged in the same sample order as odd numbered samples of said second channel, said apparatus reproducing samples of a unit time of said two channels recorded on said second and third regions of first and second tracks and at least part of redundant signals for error detection or error correction completed in each track arranged distributed in the first region of each track, comprising:

reproducing means for reproducing the signals while scanning said tracks;

decoding means for carrying out error correction or error detection of signals for each track; and reproduced signal processing means for rearranging an order of samples from the first and second two tracks and outputting the samples in each channel as a unit of digital signals with errors corrected or detected, said reproduced signal processing means including means for recovering the original order of the samples from reproduced signals including even numbered samples of said first channel reproduced from the second region of said first track, odd numbered samples of said second channel reproduced from the third region of said first track, even numbered samples of said second channel reproduced from the second region of said second track, wherein said even numbered samples of said second channel are arranged in the same sample order as the even numbered samples of said first channel, and odd numbered samples of said first channel reproduced from the third region of said second track, wherein said odd numbered samples of said first channel are arranged in the same sample order as the odd numbered samples of said second channel.

10. A method of rotary head type magnetic recording for recording first and second channels of digital signals on a recording medium while forming slanting tracks, wherein each of said tracks includes at least a first region positioned to include the center of the track and second and third regions positioned on both sides of said first region, respectively, comprising the steps of:

separating samples of each of said first and second channels inputted in a unit time into even numbered input samples and odd numbered input samples, arranging all the samples of a unit time for said channels in said second and third regions of first and second tracks, recording the even numbered samples of said first channel in the second region of said first track, recording the odd numbered samples of said second channel on the third region of said first track, recording the even numbered samples of said second channel on the second region of said second track to have the same sample order as the even numbered samples of said first channel, and recording the odd numbered samples of said first channel on the third region of said second track to have the same sample order as the odd numbered samples of said second channel, and recording on one track all redundant signals for error control of the digital signals arranged on said one track, wherein at least part of the redundant signals are recorded on said first region.

11. A method of rotary head type magnetic reproduction for reproducing first and second channels of digital signals, the digital signals of each channel represented by odd and even samples having an original order, and for reproducing redundant signals for error control on each track, at least part of which are recorded in a first region of each track together with samples being controlled by said redundant signals, while successively scanning slanting tracks formed on a recording medium, wherein each of said tracks includes said first region positioned to include the center of the track, and second and third regions positioned on both sides thereof, samples of a unit time of two channels arranged on said second and third regions of first and second tracks; and wherein even numbered samples of said second channel are arranged in the same sample order as the even numbered samples of said first channel and odd numbered samples of said first channel are arranged in the same sample order as the odd numbered samples of said second channel, respectively, and wherein error correction or error detection is carried out by using said redundant signals as a unit with samples recorded therewith on one track, and further comprising the steps of:

reproducing even numbered samples of the first channel from the second region of said first track, reproducing odd numbered samples of the second channel from the third region of the first track, reproducing even numbered samples of said second channel from the second region of said second track, said even numbered samples of said second channel arranged in the same sample order as the even numbered samples of said first channel, reproducing from the third region of said second track the odd numbered samples of said first channel, said odd numbered samples of said first channel arranged in the same sample order as the odd numbered samples of said second channel, and outputting samples with a sample order rearranged from an order in which the samples are recorded on said tracks to the original order thereof.

12. A helical scanning magnetic recording method wherein:

data is divided into prescribed samples for recording two channels on two tracks grouped as a pair; a redundancy signal for error correction or error detection is generated from data samples to be recorded on a single track; at least part of said redundancy signal is located in a central portion of each track; each track is divided into first and second halves by said redundancy signal located at the central portion thereof; and said data samples for said pair of tracks are recorded to be arrayed on the first and second halves of each track, said helical scanning magnetic recording method comprising the steps of:

separating said data into even samples and odd samples for each channel, recording the even samples of a first channel on the first half of a first track and the odd samples of a second channel on the second half of said first track, recording the even samples of the second channel on the first half of a second track to have the same sample order as the even numbered samples of said first channel, and recording the odd samples of the first channel on the second half of said second track to have the same sample order as the odd numbered samples of said second channel.

13. A magnetic reproducing method for reproducing data from a magnetic record medium by a helical scanning system, wherein:

at least part of a redundancy signal for error correction or error detection is located at a central region of each track; data for two channels recorded on two tracks is separated into even samples and odd samples for each channel, said two tracks forming a respective pair; each track being divided into a first half and a second half by said part of said redundancy signal at the central region thereof; the even samples of a first channel are arrayed in a first predetermined order on the first half of a first track; the odd samples of a second channel are arrayed in a second predetermined order on the second half of said first track; the even samples of the second channel are arrayed on the first half of a second track in the same first predetermined sample order as the even numbered samples of said first channel; and the odd samples of the first channel are arrayed on the second half of said second track in the same second predetermined sample order as the odd numbered samples of said second channel, said magnetic reproducing method comprising the steps of: reproducing, from the first half of said first track, the even samples of the first channel which are arrayed in the same first predetermined sample order as the even numbered samples of said second channel, and reproducing, from the second half of said first track, the odd samples of the second channel which are arrayed in the same second predetermined sample order as the odd numbered samples of said first channel, and reproducing the even samples of the second channel from the first half of said second track and the odd samples of the first channel from the second half of said second track.

14. A helical scanning magnetic recording and reproducing method for recording and reproducing data, wherein:

a prescribed amount of data for two channels recorded on two tracks grouped as a pair is divided into prescribed units; a redundancy signal for error correction or error detection is generated from data to be recorded on a single track; at least part of said redundancy signal is located at a central region of each track; each track being divided into first and second halves by said part of said redundancy signal at the central region thereof; and said prescribed amount of data is allotted to said first and second halves in correspondence to said prescribed units, said helical scanning magnetic recording and reproducing method comprising:

for recording, separating said prescribed amount of data into even samples and odd samples for each channel, wherein said even and odd samples have an original order in said data, recording the even samples of a first channel in a first predetermined order on the first half of a first track, recording the odd samples of a second channel in a second predetermined order on the second half of said first track, recording the even samples of the second channel on the first half of a second track in the same first predetermined sample order as the even numbered samples of said first channel, and recording the odd samples of the first channel on the second half of said second track in the same second predetermined sample order as the odd numbered samples of said second channel, for reproducing, reproducing the even samples of the first channel from the first half of said first track and the odd samples of the second channel from the second half of said first track, reproducing the even samples of the second channel from the first half of said second track and the odd samples of the first channel from the second half of said second track, and outputting samples with a sample order rearranged from an order in which the samples are recorded on said tracks to the original order thereof.

15. A magnetic tape wherein digital signals from two channels A and B are recorded on a plurality of different tracks, said magnetic tape including:

a record pattern including redundant words for error correction or error detection generated from an information signal recorded on a single track, wherein at least a part of said redundant words are arrayed in a central portion of the track and wherein each track has first and second regions separated by said central portion of the track and forming a boundary between said first and second regions, even samples of the channel A being arranged in a first predetermined order in a first region of a first track, odd samples of the channel B being arranged in a second predetermined order in a second region of the first track, even samples of the channel B being arranged in a first region of a second track in the same first predetermined sample order as the even samples of the channel A, and odd samples of the channel A being arranged in a second region of the second track in the same second predetermined sample order as the odd samples of the channel B.

* * * * *